United States Patent [19]

Dickson

[11] 4,415,224
[45] Nov. 15, 1983

[54] HOLOGRAPHIC SCANNER DISC WITH DIFFERENT FACET AREAS

[75] Inventor: LeRoy D. Dickson, Raleigh, N.C.

[73] Assignee: International Business Machines Corporation, Armonk, N.Y.

[21] Appl. No.: 271,344

[22] Filed: Jun. 8, 1981

[51] Int. Cl.³ .............................................. G02B 5/32
[52] U.S. Cl. ................................................. 350/3.71
[58] Field of Search ..................................... 354/3.71

[56] References Cited

U.S. PATENT DOCUMENTS 3,922,059 11/1975 Noguchi ............................ 350/3.71
4,094,576 6/1978 Heiling ............................... 350/3.71

Primary Examiner—Bruce Y. Arnold
Attorney, Agent, or Firm—Gerald R. Woods

[57] ABSTRACT

A scan pattern for a bar code scanner is produced by the combination of a coherent light source, a rotating disc with holographic facets and an array of fixed, beam folding mirrors. Light reflected from a bar code label follows a retroreflective path to a photodetector within the scanner. To reduce variations in the amount of light collected through different facets, the areas of the facets are varied as a function of beam elevation and beam path length.

10 Claims, 3 Drawing Figures

HOLOGRAPHIC SCANNER DISC WITH DIFFERENT FACET AREAS

TECHNICAL FIELD

The present invention relates to optical scanners and more particularly to a holographic scanner disc having facets of different areas.

BACKGROUND ART

In one type of optical scanner used for reading bar-coded labels, a scanning pattern is generated by using a rotating, multi-faceted hologram-bearing member to deflect a coherent light beam produced by a stationary laser. The deflected beam is typically redirected by one or more beam folding mirrors in a set of fixed mirrors to form the final pattern. The deflected beam leaves the deflecting element at different angles relative to the surface of the element so that it strikes different mirrors in the array or strikes the same mirrors at different points to produce noncoincident scan lines in the final pattern.

Scanners can operate in a retroreflective mode. That is, light reflected from a label will re-enter the scanner along the path of the outgoing beam. The reflected light will traverse at least part of that path before being collected at a photodetector. The photodetector converts the collected light into an electrical signal which is processed to find and decode a scanned label.

In known systems, the facets of the rotating, hologram bearing member are the same size. While this is advantageous from a manufacturing standpoint, uniform facets possess at least one disadvantage when used in a retroreflective scanner which generates a multidirectional scanning pattern. Different amounts of light are retroreflected from or through such facets depending upon the characteristics of the outgoing beam. The variations in collected light level produce corresponding variations in the electrical signal produced by the photodetector. The electronics used to process the electrical signal must be designed with a wide dynamic range to accommodate the variations in the electrical signal. This requirement adds to the cost and complexity of the system.

SUMMARY

The present invention is an improvement in a retroreflective scanner of the type having a coherent light beam source, a multifaceted, rotating holographic optical element for deflecting the coherent light beam along predetermined scan lines and a photosensitive detector for detecting the level of reflected light. The improvement comprises making the facets have different areas to reduce variations in light collection efficiency from one facet to the next.

The present invention reduces the dynamic range required of the signal processing electronics.

BRIEF DESCRIPTION OF THE DRAWINGS

While the description concludes with claims particularly pointing out and distinctly claiming that which is regarded as the invention, details of a preferred embodiment of the invention may be more readily ascertained from the following technical description when read in conjunction with the accompanying drawings, wherein:

TECHNICAL DESCRIPTION

Figure 1:
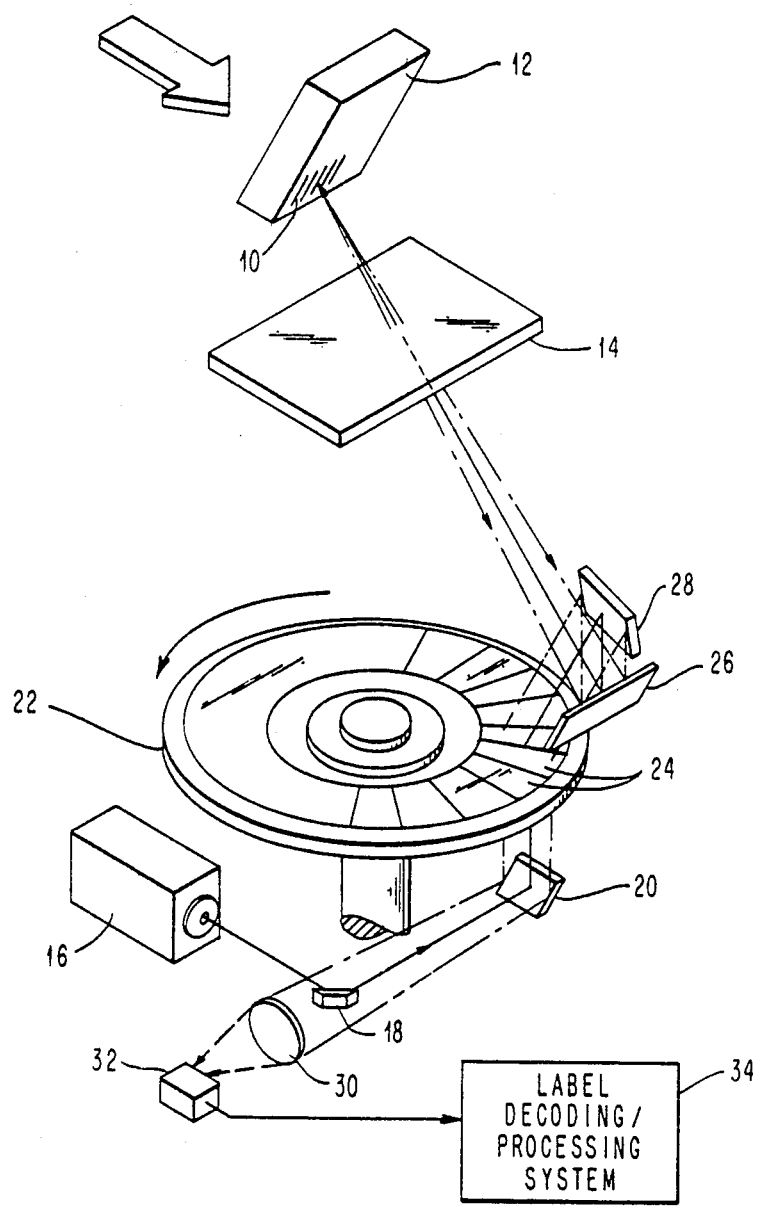
FIG. 1 is a simplified perspective view of an optical scanner in which a scanner disc made in accordance with the present invention may be used.

Referring to FIG. 1, an optical scanner using a rotating member or disc 22 made in accordance with the present invention can be used to read a bar coded label 10 on a grocery item 12 which is moved over a transparent scanner window 14 in a checkout stand surface (not shown). The light beam used to scan the label 10 is produced by a laser 16. The beam is reflected from a small mirror 18 before being directed upwardly by a second mirror 20 toward the underside of the transparent disc 22 which carries a number of holographic optical elements or facets 24. Each facet is preferably generated by interfering two coherent light beams in accordance with well known interferometric techniques. The disc 22 is rotated at a high, nominally-constant speed by an electric drive motor (not shown). As the light beam passes through disc 22, it is deflected along an arcuate scan line by each of the facets 24 when the facet moves through the beam.

The deflected beams are directed toward a set of beam folding mirrors. For purposes of illustration, only two mirrors 26 and 28 are illustrated. In a practical scanner, the set may have six to twelve individual mirrors, depending on the complexity of the scan pattern being generated. In the simplified system shown in the drawing, the beam is reflected from mirror 26 onto mirror 28. The beam reflected from mirror 28 passes through the scanner window 14 along a particular scan line.

When the beam strikes a grocery item, light is diffusely reflected from the item back along the beam path. The light reflected from a small area generally follows a diverging or conical path illustrated by the dotted lines. The light is retroreflected from mirror 28 to mirror 26 to the surface of the disc 22. Light transmitted through the disc 22 strikes the mirror 20 and is directed toward the small mirror 18. Most of the returning light bypasses mirror 18 and is incident on a condensing lens 30. Lens 30 focusses the returning light onto a photodetector 32. The output of the photodetector 32 is applied to a data processing system 34 which performs the known functions of finding, decoding and processing the label information.

Figure 2:
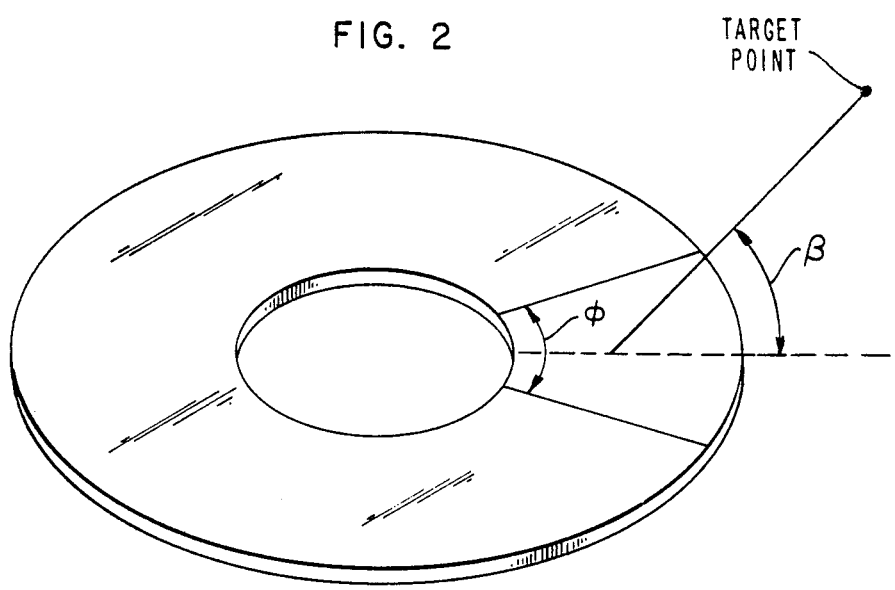
FIG. 2 is a perspective view of a scanner disc with labels which define several equation terms.

Referring to FIG. 2, any light beam being deflected by a facet on a holographic disc can be defined as leaving the surface of the disc at an angle B. The angle B is a function of the characteristics of the particular hologram in the facet. As mentioned earlier, beams leave the disc surface at different angles of elevation to strike different mirrors or strike the same mirrors in different places to form different scan lines in a scanning pattern. Each beam can also be defined in terms of the path length or distance R traveled by that beam before it reaches a target area. In the following discussion, the surface of the scanner window 14 is arbitrarily designated as the target area. Any plane above or below the scanner window could be considered to be a target area as long as that plane is at a fixed distance from the surface of the disc. Obviously, the distance R will usually be greater where a beam is folded by a greater number of mirrors before it reaches the target area.

The light collection efficiency of a facet is a direct function of the sine of the angle of elevation B for the beam leaving that facet. This is because the facet presents an area to the retroreflected light beam which is equal to K sin B where K is the surface area of the facet. The light collection efficiency also varies inversely with the square of the distance R from the target area to the disc measured along the beam path.

The absolute light collection efficiency of any given facet is equal to K sin B $(1/R)^2$A where K is the absolute surface area of the facet, B is the angle of elevation of the beam deflected by that facet, R is the length of the beam path from the disc surface to the target area, and A is a constant dependent upon the reflection coefficients of mirrors in the beam path and upon known polarization effects.

To reduce variations in light collection efficiency, it is necessary only to know the relative light collection efficiency of each facet. Since it can be assumed that the facets are sectoral in shape and have the same inner and outer radii, the area of any given facet relative to the area of other facets is a direct function of the angular width $\phi$ of the facet. In terms of beam path length, the relative light collection efficiency of a given facet Rx is equal to $(R1/Rx)^2$ where R1 is the beam path length for an arbitrarily selected facet 1 on the scanning disc. The quantities B and R are established primarily as a function of the particular scan pattern desired. The quantity $\phi$ can, however, be varied to alter the light collection efficiency of a given facet. To achieve reasonably uniform light collection efficiency, the following equation can be used:

$$\phi 1 \sin B1 = \phi 2 \sin B2(r1/r2)^2 A2 = \phi 3 \sin B3(r1/r3)^2 A3 \ldots = \phi n \sin Bn(r1/rn)^2 An,$$

where
$\phi$ represents the angular width of each facet,
B represents the angle of elevation of a beam emerging from that facet,
R1 is the beam path length on a given reference facet to the target area or scanner window,
R2, R3, etc., represent the beam path lengths for the remaining facets on the disc, and
A is a constant which reflects the number of mirrors in a path traveled by a particular beam and any polarization effects.

The solution to this equation will establish the relative angular widths of all of the beam deflecting facets on the disc.

Figure 3:
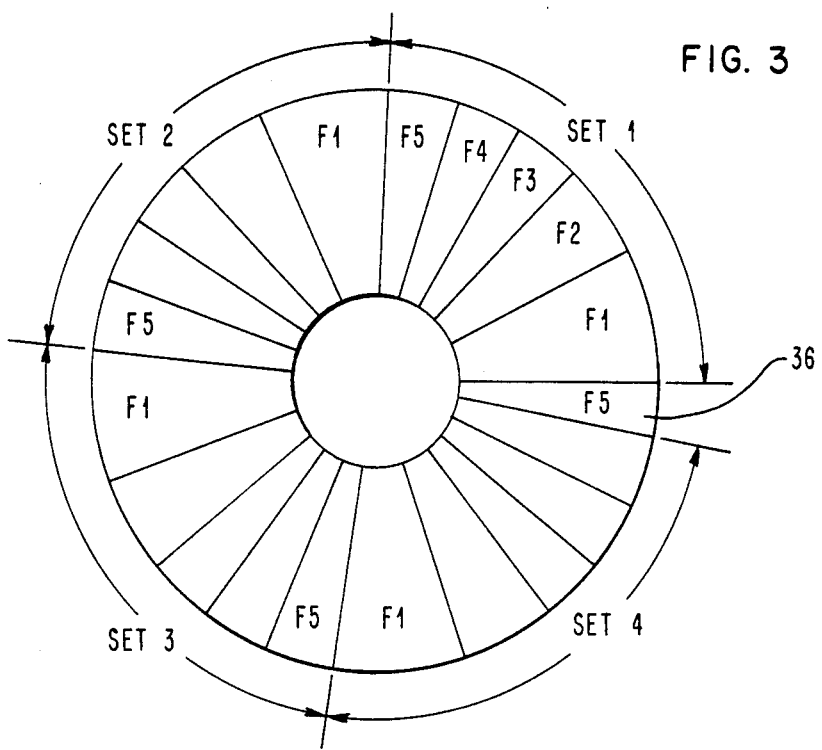
FIG. 3 is a plan view of a scanner disc having a preferred facet structure.

In a preferred embodiment, the surface of the disc 22 may be divided into four sets of facets with each facet in a set having the same angular width as the corresponding facets in the other sets. Referring to FIG. 3, the disc surface is shown as being divided into the four sets. The relatively narrow facet 36 may be reserved for directing a light beam at a diagnostic label attached to the scanner. While the angular width of the diagnostic facet 36 could be taken into account in computing the angular width of the other facets of the disc, it is not necessary to do so. To calculate the angular width of each of the five facets F1, F2, F3, F4, F5, the combined angular width of the facets in the first set can be calculated. If the diagnostic facet is assumed to have a 10° angular width, the total width of each of the sets of facets would be 360°-10°/4 or 87.5°. Once the angular width of each of the facets on the first set is calculated, the same angular width can be repeated for the corresponding facets in sets 2, 3, and 4.

It would be possible to calculate exact angular widths for each of the facets and to fabricate a disc having sectors of those exact angular widths. It is likely that certain facets (e.g., F3, F4, and F5) will be roughly of the same size. For ease of manufacture, such facets can be made the same size without introducing significant variations in light collection efficiency.

While there has been described what is considered to be a preferred embodiment of the invention, variations and modifications therein will occur to those skilled in the art once they become acquainted with the basic concepts of the invention. Therefore, it is intended that the appended claims should be construed to include not only the preferred embodiment, but all such variations and modifications as fall within the true spirit and scope of the invention.

Having thus described my invention with reference to a preferred embodiment thereof, what I claim and desire to protect by Letters Patent is:

1. In a retroreflective optical scanner of the type having a coherent light beam source, a multifaceted, rotating holographic optical element for deflecting the coherent beam along predetermined scan lines and a photosensitive detector for detecting the level of light retroreflected from an object through a facet, the improvement which comprises making the facets have different areas to reduce the variations in light collection efficiency from one facet to the next.

2. An improved scanner as defined in claim 1 wherein the width of each facet is a function of the angle between the element surface and the axis of the deflected beam.

3. An improved scanner as defined in claim 2 wherein the width of each facet is also a function of the length of the beam path between the element surface and a target area fixed in space relative to the element surface.

4. An improved scanner as defined in claim 3 wherein the width $\phi$ of each of n facets is determined as a function of the equation $$\phi 1 \cdot \sin B1 = \phi 2 \sin B2(r1/r2)^2 A2 = \phi 3 \sin B3(r1/r3)^2 A3 = \ldots \phi n \sin Bn(r1/rn)^2 1n$$

where
Bx is the angle between the beam axis and the element surface,
r1 is a reference distance measured along a given beam path from the element surface to a target area fixed in space relative to the element surface,
rx is the distance measured along other beam paths from the element surface to the target area, and
Ax is a modification factor determined by the reflection coefficients of mirrors in the beam path and polarization effects.

5. In a retroreflective optical scanner of the type having a coherent light beam source, a rotating disc having n holographic facets for deflecting the coherent beam along predetermined scan lines to form a scan pattern in a target area which is at a fixed distance from the disc surface and a photosensitive detector for detecting the level of light reflected from the target area through a facet, the improvement which comprises making at least some of the holographic facets of different widths to reduce variations in light collection efficiency from one facet to the next.

6. An improved scanner as defined in claim 5 wherein the width of each facet is a function of the angle between the disc surface and the axis of the deflected beam.

7. An improved scanner as defined in claim 6 wherein the width of each facet is also a function of the length of the beam path between the disc surface and the target area.

8. An improved scanner as defined in claim 7 wherein the width $\phi$ of each of n facets is determined as a function of the equation $$\phi 1 \sin B1 = \phi 2 \sin B2(r1/r2)^2 A2 = \phi 3 \sin B3(r1/r3)^2 A3 \ldots \phi n \sin Bn(r1/rn)^2 An$$

where

Bx is the angle between the beam axis and the disc surface, r1 is a reference distance measured along a given beam path from the disc surface to the target area, rx is the distance measured along other beam paths from the disc surface to the target area, and Ax is a modification factor determined by the reflection coefficients of mirrors in a beam path and polarization effects.

9. An improved scanner as defined in claim 8 wherein the disc surface is subdivided into K substantially identical sets of facets, each said set occupying a sector less than or equal to 360°/K in width.

10. An improved scanner as defined in claim 9 wherein facets having calculated widths falling within a predetermined range are actually made a uniform width to simplify disc manufacture.

* * * * *